US012700794B2

(12) United States Patent
Baek

(10) Patent No.: US 12,700,794 B2
(45) Date of Patent: Aug. 4, 2026

(54) POWER SUPPLY DEVICE CIRCUIT FOR RADIATION-TOLERANT

(71) Applicant: Jong Hak Baek, Seoul (KR)

(72) Inventor: Jong Hak Baek, Seoul (KR)

( * ) Notice: Subject to any disclaimer, the term of this patent is extended or adjusted under 35 U.S.C. 154(b) by 189 days.

(21) Appl. No.: 18/510,742

(22) Filed: Nov. 16, 2023

(65) Prior Publication Data

US 2024/0088780 A1     Mar. 14, 2024

Related U.S. Application Data

(63) Continuation of application No. PCT/KR2021/006507, filed on May 25, 2021.

(30) Foreign Application Priority Data

May 21, 2021    (KR) ........................ 10-2021-0065732

(51) Int. Cl.
| | |
|---|---|
| *H02M 1/32* | (2007.01) |
| *H02M 3/156* | (2006.01) |
| *H02M 3/335* | (2006.01) |
| *H05B 45/38* | (2020.01) |
| *H05B 45/385* | (2020.01) |

(52) U.S. Cl.
CPC ............. *H02M 1/32* (2013.01); *H02M 3/156* (2013.01); *H02M 3/33507* (2013.01); *H05B 45/38* (2020.01); *H05B 45/385* (2020.01)

(58) Field of Classification Search
CPC ...................................................... H02M 1/32
See application file for complete search history.

(56) References Cited

U.S. PATENT DOCUMENTS

| | | | |
|---|---|---|---|
| 8,519,631 | B2 | 8/2013 | Lee et al. |
| 8,901,843 | B2 | 12/2014 | Jin et al. |
| 2005/0218963 | A1 | 10/2005 | Ball et al. |
| 2012/0119659 | A1 | 5/2012 | Lee et al. |
| 2012/0119674 | A1 | 5/2012 | Lee et al. |
| 2013/0249427 | A1 | 9/2013 | Jin et al. |

(Continued)

FOREIGN PATENT DOCUMENTS

| | | | |
|---|---|---|---|
| JP | H03128523 A | * | 5/1991 |
| JP | 2010-074939 A | | 4/2010 |
| JP | 2012-105529 A | | 5/2012 |

(Continued)

OTHER PUBLICATIONS

English translation of JP H03128523 A (Year: 2025).*

(Continued)

*Primary Examiner* — Alex Torres-Rivera
(74) *Attorney, Agent, or Firm* — Studebaker Brackett PLLC

(57) ABSTRACT

A power supply device according to one aspect of the present invention comprises: a switch including a first terminal and a second terminal receiving a control signal, the switch operating to be turned on or off by comparing the magnitude between a threshold voltage and a voltage between the first terminal and the second terminal; and a protection element connected to the first terminal to change the magnitude of a source voltage of the first terminal, wherein the magnitude of the source voltage of the first terminal may be adjusted to be higher than when the protection element is not present.

6 Claims, 11 Drawing Sheets

(56) References Cited

U.S. PATENT DOCUMENTS

2017/0245341 A1 *   8/2017   Lee ........................ H05B 45/38

FOREIGN PATENT DOCUMENTS

| | | | |
|---|---|---|---|
| KR | 10-2008-0050856 | A | 6/2008 |
| KR | 10-1337349 | B1 | 12/2013 |
| KR | 10-1517225 | B1 | 5/2015 |
| KR | 10-1718959 | B1 | 3/2017 |
| KR | 10-1739697 | B1 | 5/2017 |
| KR | 10-2017-0126822 | A | 11/2017 |
| KR | 10-1878561 | B1 | 8/2018 |

OTHER PUBLICATIONS

International Search Report issued in PCT/KR2021/006507; mailed Aug. 16, 2022.

An Office Action, "Notice of Reasons for Refusal," mailed by the Japanese Patent Office on Nov. 19, 2024, which corresponds to Japanese Patent Application No. 2023-571829 and is related to U.S. Appl. No. 18/510,742.

An Office Action, "Notice of Submission of Opinion," mailed by the Korean Ministry of Intellectual Property on Feb. 23, 2023, which corresponds to Korean Patent Application No. 10-2021-0065732 and is related to U.S. Appl. No. 18/510,742.

The extended European search report issued by the European Patent Office on Sep. 5, 2024, which corresponds to European Patent Application No. 21940917.4-1211 and is related to U.S. Appl. No. 18/510,742.

* cited by examiner

Driving controller
(control signal)

Controller
signal

G31

G32

$V_d$

P3c

POWER SUPPLY DEVICE CIRCUIT FOR RADIATION-TOLERANT

CROSS-REFERENCE TO RELATED APPLICATIONS

The present application is a continuation of International Patent Application No. PCT/KR2021/006507, filed on May 25, 2021, which is based upon and claims the benefit of priority to Korean Patent Application No. 10-2021-0065732 filed on May 21, 2021. The disclosures of the above-listed applications are hereby incorporated by reference herein in their entirety.

BACKGROUND

When a switched mode power supply (hereinafter, SMPS), which is a power supply device of an LED lighting device, is exposed to a high level of a radiological environment for a predetermined time or more, the SMPS is destructed. In the case that the SMPS is destructed, power is not supplied to the LED lighting device, and a fatal problem occurs that the LED lighting device does not operate anymore. Accordingly, to use an electronic device such as the LED lighting device at a place having a specific spatial property such as the high level of a radiological environment, the problem of the destruction of the LED lighting device needs to be solved.

A place of a nuclear power plant and an electronic device of the LED lighting device are used for the description of the present disclosure, but this is not intended to limit the scope of the present disclosure. A power supply device is essentially required to supply power to all electronic devices. Therefore, it is understood that the present disclosure relates to a power supply device and the driving method of an electronic device which is used in a place in which an environmental stress occurs owing to the specific spatial property.

SUMMARY

The technical problem to be solved is to provide a power supply device and the driving method of an electronic device which is usable in a place in which an environmental stress occurs such as a space of an environment having intensive cosmic rays due to solar activity as in a cosmic space or a space of an environment having strong electromagnetic waves and radiation such as a reactor containment building of a nuclear power plant.

Problems to be solved by the inventive concept are not limited to the problems mentioned above, and other problems not mentioned will be clearly understood by those skilled in the art from the following description.

According to an embodiment, a power supply device according to an aspect of the present disclosure may include a switch including a first terminal and a second terminal receiving an input of a control signal, the switch operating to be turned on or off by comparing magnitudes of a voltage between the first terminal and the second terminal with a threshold voltage; and a protection device connected to the first terminal to change a magnitude of a source voltage of the first terminal, and the magnitude of the source voltage of the first terminal may be adjusted to be increased in comparison with a case that the protection device is not present.

According to an embodiment of the power supply device may further include a switching converter for generating an output power by using an input power of an input power supplier including the switch and the protection device; a driving controller for generating an operation control signal of the switching converter; and a power generator for supplying power to at least one of the switching converter or the driving controller.

Furthermore, the protection device may be constructed to be connected to a ground of the switching converter with the first terminal, the protection device may be constructed to introduce the source voltage to the first terminal based on the control signal being introduced and the switch being turned on, and the protection device may include at least one of a plurality of resistors of a predetermined resistance or a plurality of diodes having a threshold voltage of a predetermined magnitude.

Furthermore, the switch may operate to be turned on or off by comparing a voltage difference between the first terminal and the second terminal with the threshold voltage.

Furthermore, the driving controller may determine the control signal such that a maximum value of a voltage difference between the first terminal and the second terminal, which is a voltage to turn on the switch, exceeds a changed absolute value of the threshold voltage.

Furthermore, the switching converter may further include a feedback resistor connected to the driving controller and disposed between the protection device and the ground.

Furthermore, the switching converter may further include a buffer capacitor connected to the feedback resistor in parallel and disposed between the protection device and the ground.

Furthermore, the power supply device according to an embodiment of the present disclosure may further include a product load driven by receiving the output power, In this case, the driving controller may determine the control signal able to supply the output power that corresponds to the product load through the input power and an inductor based on a current flowing through the feedback resistor.

Furthermore, the switch may include a third terminal connected to an inductor,

In this case, the driving controller may determine the control signal that decides an amount of current delivered through the third terminal based on the current flowing through the feedback resistor independently from the change of the threshold voltage.

Furthermore, the protection device may be constructed by connecting a first diode group and a second diode group in parallel, and the first diode group includes at least one diode connected in a first direction in serial and the second diode group includes at least one diode connected in a second direction which is opposite to the first direction in serial. Other details according to an embodiment of the inventive concept are included in the detailed description and drawings.

BRIEF DESCRIPTION OF THE FIGURES

FIGS. 3A to 3C are diagrams illustrating an embodiment in which the protection device is implemented as a diode.

DETAILED DESCRIPTION

Figure 1:
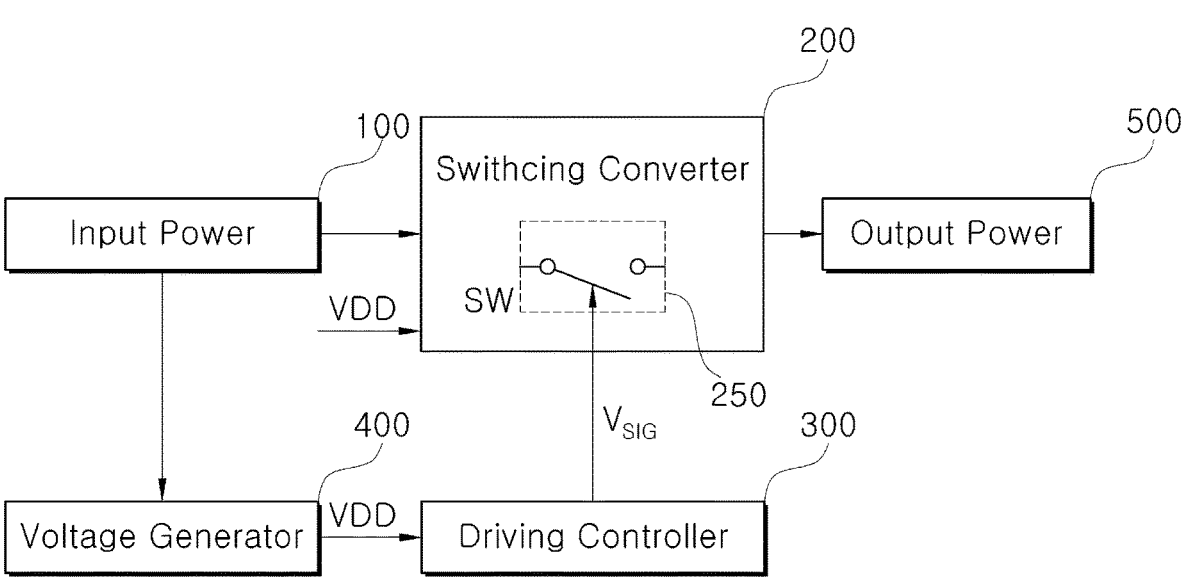
FIG. 1 is a block diagram illustrating a power supply device according to an embodiment of the present disclosure.

Advantages and features of the inventive concept and methods for achieving them will be apparent with reference to embodiments described below in detail in conjunction with the accompanying drawings. However, the inventive concept is not limited to the embodiments disclosed below, but can be implemented in various forms, and these embodiments are to make the disclosure of the inventive concept complete, and are provided so that this disclosure will be thorough and complete and will fully convey the scope of the invention to those of ordinary skill in the art, which is to be defined only by the scope of the claims.

The terminology used herein is for the purpose of describing particular embodiments only and is not intended to be limiting of the inventive concept. The singular expressions include plural expressions unless the context clearly dictates otherwise. In this specification, the terms "comprises" and/or "comprising" are intended to specify the presence of stated elements, but do not preclude the presence or addition of elements. Like reference numerals refer to like elements throughout the specification, and "and/or" includes each and all combinations of one or more of the mentioned elements. Although "first", "second", and the like are used to describe various components, these components are of course not limited by these terms. These terms are only used to distinguish one component from another. Thus, a first element discussed below could be termed a second element without departing from the teachings of the inventive concept.

Unless otherwise defined, all terms (including technical and scientific terms) used herein have the same meaning as commonly understood by one of ordinary skill in the art to which this invention belongs. It will be further understood that terms such as those defined in commonly used dictionaries, will not be interpreted in an idealized or overly formal sense unless expressly so defined herein.

Hereinafter, embodiments of the present disclosure will be described with reference to the accompanying drawings.

The conventional art to solve the problem that a power supply device of an electronic device used in a radiological environment is destructed approaches in the passive circumventing protection method of minimizing exposure to radiation of a component which is vulnerable to radiation (Patent Document 0001). However, according to the conventional protection method using the radiation shield, since it is impossible to shield the radiation perfectly, there is a limit that the method is partially applicable to an environment of a low level of radiation absorbed dose of a predetermined level or lower. Therefore, a more secure method of solving the problem is required.

To describe a proposed embodiment of the present disclosure to solve the problem, the reason that a power supply device is destructed in a high-level of radiological environment is as below. When several components constructing the power supply device are exposed to the radiological environment, the electrical characteristics of the components are changed owing to the influence of the radiation. When an overcurrent flows accordingly, a switch device is destructed, and therefore, the power supply device is also destructed and does not operate.

Based on the result of analyzing the reason, a preferred embodiment to implement the present disclosure is described with reference to the drawings.

FIG. 1 is a block diagram illustrating a power supply device according to an embodiment of the present disclosure. The power supply device according to an embodiment includes a switching converter 200 using an input power of AC or DC supplied from an input power 100, including a switch 250, and generating an output power by using the operation of the switch 250, a driving controller 300 for generating a control signal $V_{SIG}$ for controlling the switch 250 of the switching converter 200, and a power generator 400 for supplying required power to the switching converter 200 and the driving controller 300.

In this case, the switch 250 of the switching converter 200 of the embodiment may be implemented with a semiconductor switch device. The semiconductor switch device may be implemented with an N-type or P-type Metal-Oxide-Semiconductor Field Effect Transistor; hereinafter, MOS-FET), an NPN-type or PNP-type Bipolar Junction Transistor; hereinafter, BJT), or an Insulated gate bipolar transistor (IGBT).

The switching converter 200 of the embodiment includes a several types of power supply devices having structures of outputting a targeted output power by operating the switch 250. For example, the several types of power supply devices may include an SMPS and a linear regulator. As an example, the SMPS may include a type of using an inductor or a capacitor and an insulated or non-insulated type depending on whether a transformer is used. The non-insulated type includes Buck, Boost, Buck-Boost, Cuk, and Septic schemes, and the insulated type includes Flyback, Push-pull, and insulated Cuk schemes.

In this case, the driving controller 300 of the embodiment generates a control signal for controlling the switching converter 200.

The power generator 400 generates power required in the switching converter 200 and the driving controller 300.

The driving method of the power supply device according to an embodiment of the present disclosure is described with reference to FIG. 1. The operation of the preferred embodiment of the present disclosure is described by using a Boost converter as an embodiment. The use of the Boost converter among the several types of power supply devices is to help the understanding of the present disclosure and not intended to limit the present disclosure. In addition, in the description, the description of the element which is the same or similar to the precedent description may be omitted.

Figure 2A:
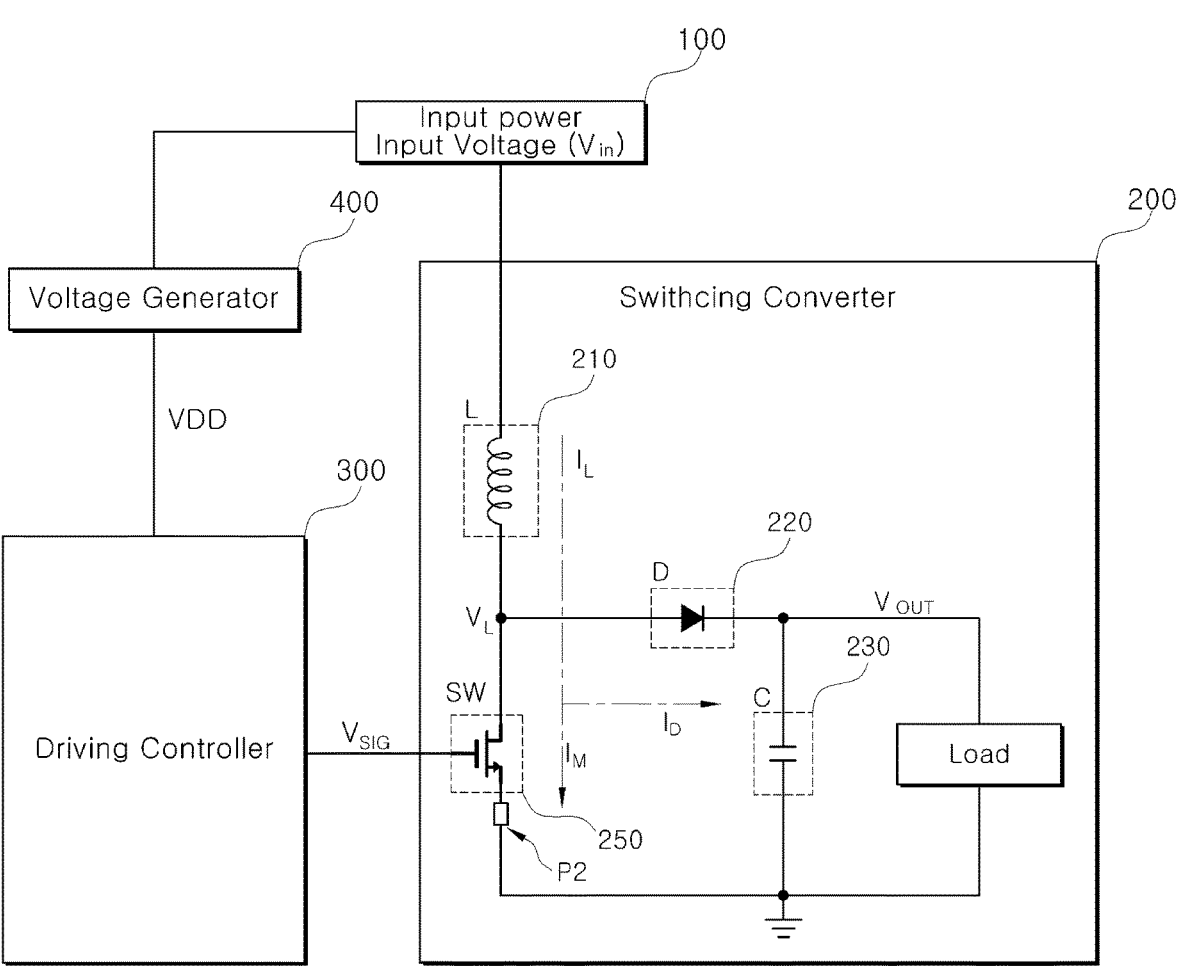
FIG. 2A is a circuit diagram illustrating a Boost converter according to an embodiment.
Figure 2B:
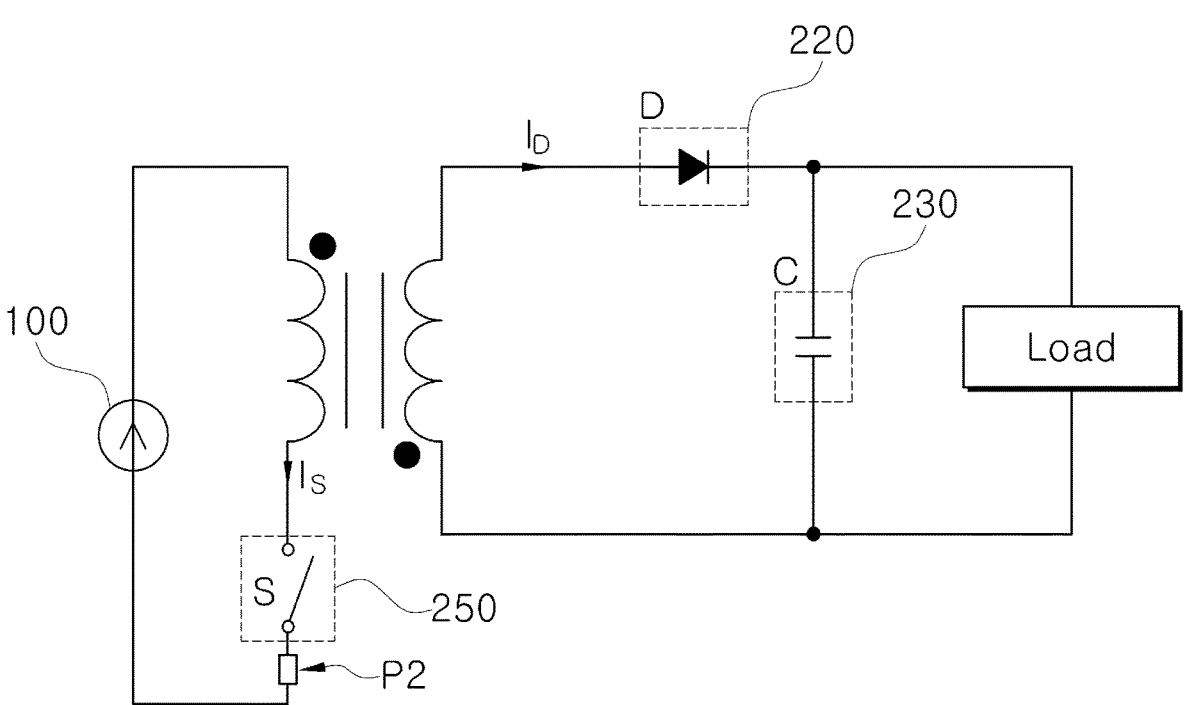
FIG. 2B illustrates a Flyback circuit diagram in which a power supply device according to another embodiment is used.
Figure 2C:
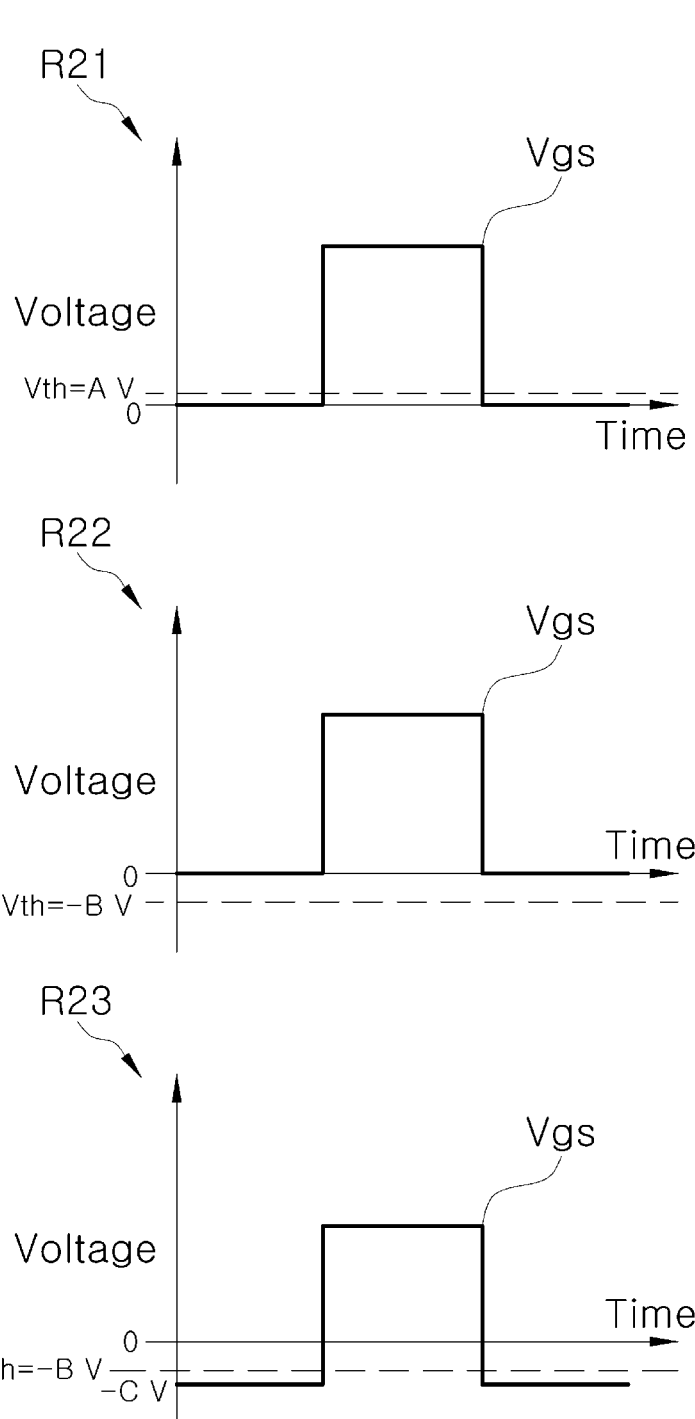
FIG. 2C is a graph illustrating a threshold voltage and a control signal according to a presence of a protection device according to an embodiment.

FIG. 2A is a circuit diagram illustrating a Boost converter according to an embodiment, FIG. 2B illustrates a Flyback circuit diagram in which a power supply device according to another embodiment is used, and FIG. 2C is a graph illustrating a threshold voltage and a control signal according to a presence of a protection device according to an embodiment.

Referring to FIG. 2A and FIG. 2B, the switching converter 200 may use an N-type MOSFET as the switch (SW) 250 for controlling a current flow and a diode (D) 220 for controlling a current flow, which operates a complementary operation with the switch 250.

The Boost circuit shown in FIG. 2A may include an inductor (L) 210 and a capacitor (C) 230 for storing energy, the driving controller 300 for generating a control signal to control the switch 250, and the power generator 400 for supplying power to the driving controller 300.

Meanwhile, the switch 250 may include a first terminal that corresponds to a source terminal and a second terminal that receives the control signal.

The control signal $V_{SIG}$ may mean a signal delivered for the driving controller 300 to control the switch 250. The second terminal may correspond to a gate terminal.

The switch 250 may operate to be turned on or off by comparing magnitudes of a voltage between the first terminal and the second terminal with a threshold voltage of the switch 250.

The switch 250 may operate based on the magnitude of the voltage difference between the first terminal and the second terminal with the threshold voltage Vth.

Particularly, in the case that the voltage difference between the first terminal and the second terminal is greater than the threshold voltage, the switch 250 operates to be turned on, and in the case that the voltage difference between the first terminal and the second terminal is smaller than the threshold voltage, the switch 250 operates to be turned off.

Meanwhile, the switch 250 may be connected to a protection device P2. The protection device P2 performs a role of introducing a higher voltage of the source terminal, which is the first terminal of the switch according to a current flow than a voltage of the source terminal in the case that the protection device is not provided.

The protection device P2 may be connected to the first terminal which is the source terminal of the switch of the switching converter 200.

Here, the source terminal voltage to which the protection device P2 is connected may be increased in comparison with the source terminal voltage to which the protection device is not connected.

When radiation is irradiated to the switch 250, the property of the switch threshold voltage is changed in comparison with the case that radiation is not irradiated. For example, in the case of an N-type MOSFET, when radiation is irradiated, the threshold voltage may be decreased or changed to a negative voltage value depending on the amount of the radiation.

In this case, if the protection device is not provided, the switch of which the threshold voltage is decreased due to the radiation may not be completely turned off with a low voltage level of the control signal which is introduced to a second terminal of the switch of the driving controller.

In the case that the protection device is not provided, the voltage level of the control signal is not below the level of the threshold voltage which is changed by the irradiation, and the switch may not be turned off, and accordingly, an excessive current may flow through the switch.

That is, in the case that the protection device is not provided, an excessive current may flow through the switching converter without regard to the control signal, and the switch may be damaged.

However, as shown in FIG. 2A, in the case that the protection device is provided to the switching converter 200, the voltage of the first terminal of the switch 250 becomes higher than the voltage of the second terminal of the switch, which prevents the overflow of current through the switching converter 200.

The switch 250 may be turned on or off by comparing the voltage difference between the first terminal and the second terminal with the threshold voltage Vth.

FIG. 2C shows the case R21 in which the threshold voltage of the switch is normal and the cases R22 and R23 in which the threshold voltage is decreased since radiation is irradiated (Herein, A, B, and C are positive numbers, and the magnitude of the absolute value of each value satisfies the condition, C>B>A).

In the case R21 that radiation is not irradiated to the normal switch 250 having the threshold voltage magnitude AV, based on the control signal output from the driving controller, when Vgs exceeds AV, the switch operates to be turned on, and when Vgs is less than AV, the switch operates to be turned off.

On the other hand, in the case such as R21 that radiation is irradiated to the normal switch 250 and the threshold voltage Vth is decreased from AV to −BV in comparison with the existing threshold voltage, when receiving the control signal as an input, since Vgs is greater than the threshold voltage at all times, the switch operates to be turned on (R22).

In this case, too much current flows through the switching converter, which overloads the switching converter.

Accordingly, in the case that Vgs introduced to the switch is decreased by increasing the voltage of the source terminal of the switch through the protection device, the switch may be turned on or off by the control signal, and accordingly, the normal operation of the switching converter 200 is available.

The protection device P2 may be provided by a predetermined resistance of resistor, a diode, or a resistor and a diode.

Meanwhile, the driving controller 300 may determine the control signal such that a maximum value of the voltage difference between the first terminal and the second terminal exceeds a changed absolute value of the threshold voltage.

For example, in the case that the threshold voltage Vth is −BV, which is decreased from AV, for the off-period of the switch 250, the voltage difference between the first terminal and the second terminal, that is, Vgs needs to be smaller than −B to prevent a short circuit of the switching converter.

In the case that a minimum vale of the source voltage of the switch 250 is implemented to be −CV due to the protection device P2 according to an embodiment, when the control signal is introduced to the source voltage, based on Vgs being greater than −BV, the switch operates to be turned on, and based on Vgs being smaller than −BV, the switch operates to be turned off (R23).

In this embodiment, if a size of the control signal is smaller than a difference between −BV and −CV, Vgs is smaller than −BV for all cases, and the switch is turned off for all cases, and accordingly, for a normal operation of the switch, the maximum value of the control signal needs to exceed the difference between −BV and −CV at the least. Therefore, the driving controller may control the operation of the switching converter by outputting the control signal exceeding the absolute value magnitude of the threshold voltage of which the maximum value of the voltage difference between the first terminal and the second terminal is changed.

The driving controller 300 may determine the control signal that enables to supply the output power that corresponds to the load through the input power 100 and the inductor 210.

Hereinafter, the operation of the Booster implemented in FIG. 2A is described.

Referring to FIG. 2A again, the Boost converter is an SMPS that increases the voltage received as an input and output the increased voltage, and controls the On-Off duty ratio of the switch 250 using the control signal, and accordingly, determines a boost voltage magnitude of the output voltage Vout according to Equation 1 below based on the input voltage Vin.

$$VOUT = \frac{1}{1-D} * VIN \, (D : \text{duty ratio}) \qquad \text{[Equation 1]}$$

Herein, the input voltage Vin may be an AC voltage or a DC voltage. In the case that the input voltage Vin is an AC voltage, a rectifier (not shown) may be further disposed in the input power supplier, and the rectifier may be implemented in various ways according to the use. In this embodiment, the rectifier output a DC voltage as an example.

The operation of the Boost converter according to an embodiment is described as below. The power generator 400 may generate and supply power to the driving controller 300 and generate the control signal $V_{SIG}$ in the driving controller 300 to control the switch 250 in the switching converter 200.

In this case, when the switch 250 is turned on by the control signal $V_{SIG}$ of a voltage level, the current IL passing through the inductor 210 from the input voltage Vin does not flow to the diode 220 direction (ID≈0) except a leakage current of the diode 220, but only the current IM flows through the switch 250 (IL≈IM), and energy is stored in the inductor 210.

Later, the switch 250 is turned off by the control signal, the current IM passing through the switch 250 does not flow, but the energy stored in the inductor 210 and the input voltage Vin are added, and the current ID passing through the diode 220 flows (IL≈ID), and accordingly, the output voltage Vout is increased. In this case, the capacitor 230 stores the output voltage Vout and supplies the output voltage to the load stably.

The control signal $V_{SIG}$ generated in the driving controller 300 is directly connected to the gate of the switch 250 of the switching converter 200 and controls the operation, and in this case, the control signal $V_{SIG}$ swings between 0 V and VDD.

The operation described as shown in FIG. 2A to FIG. 2C is merely a description of an embodiment in which the switching converter of the present disclosure operates with a Boost circuit, which does not limit the embodiment in which the switching converter operates with a Boost circuit.

Figure 3A:
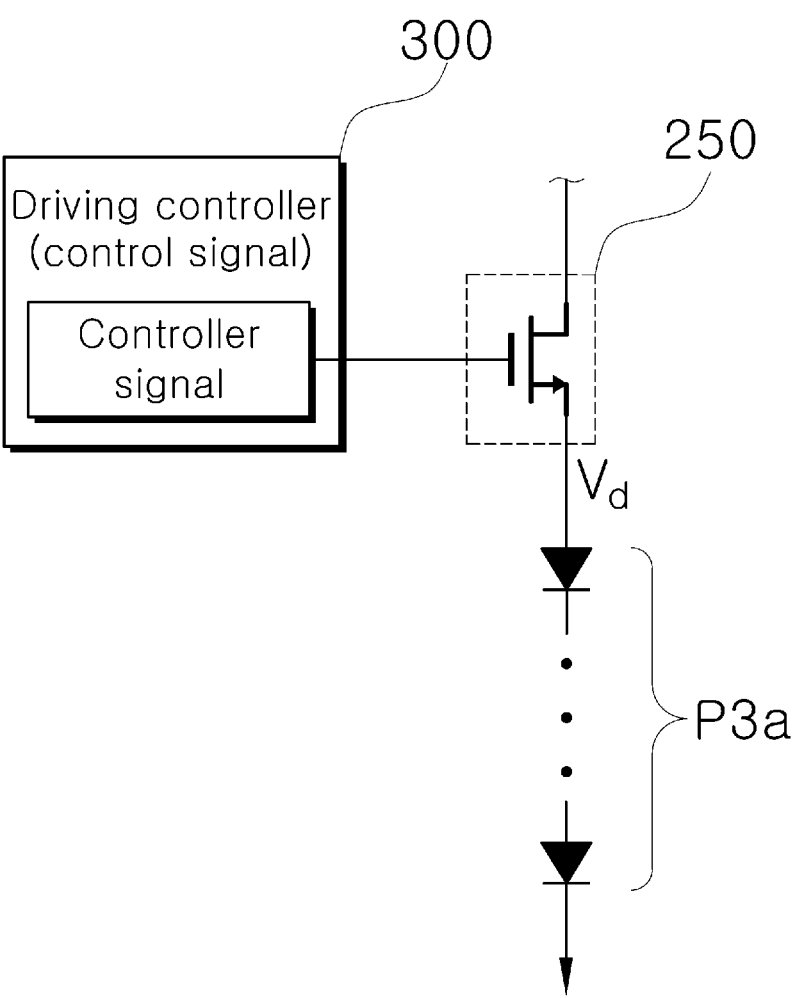
Figure 3B:
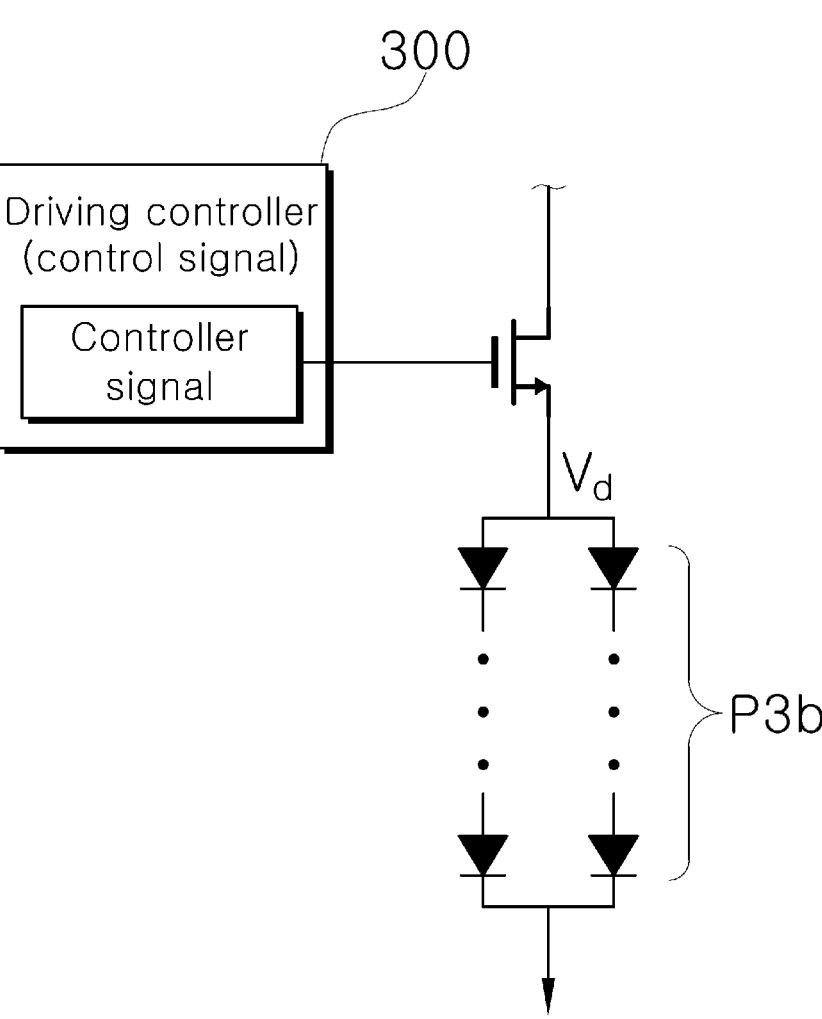
Figure 3C:
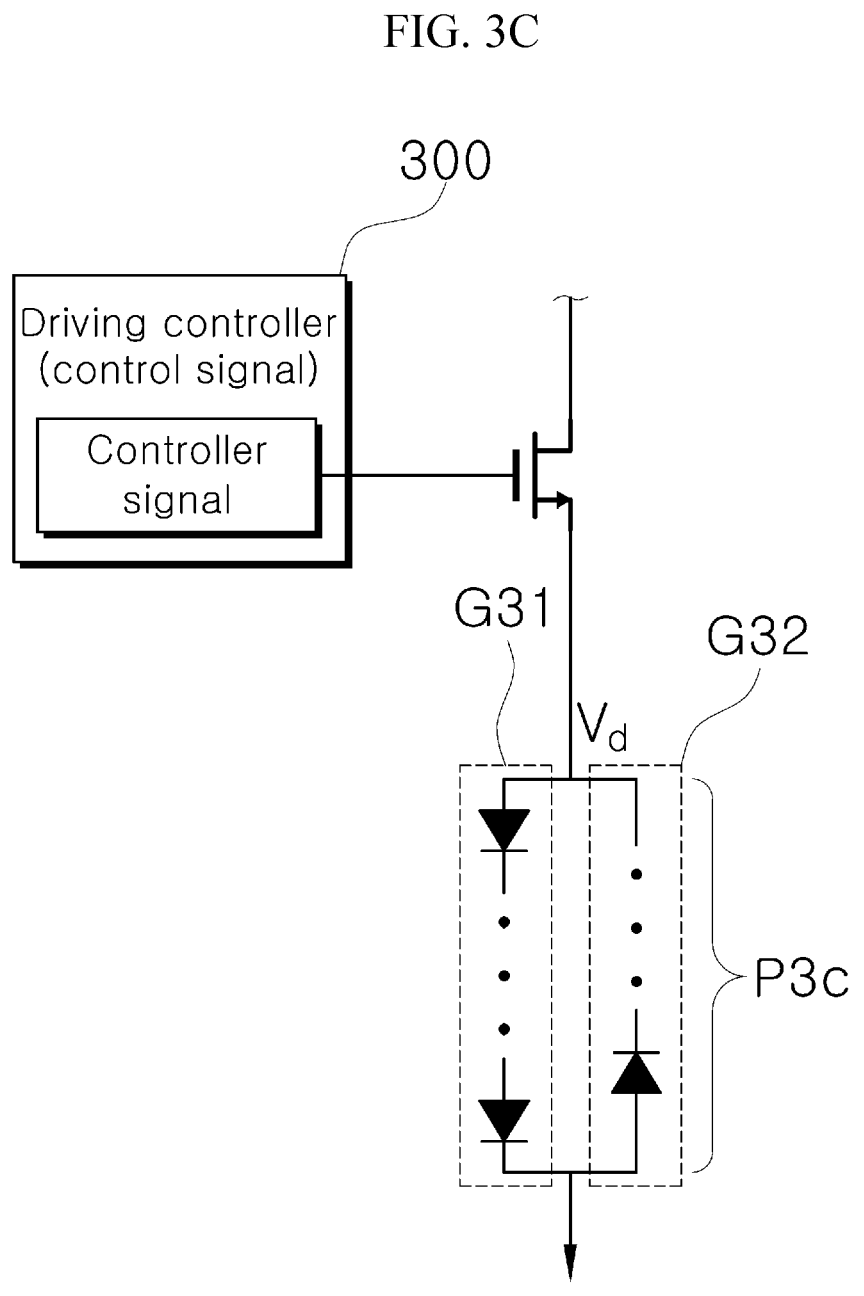

FIGS. 3A to 3C are diagrams illustrating an embodiment in which the protection device is implemented as a diode.

FIG. 3A shows the feature that the protection device P3*a* connected to the switch 250 is implemented as diodes in connection.

A diode has a specific threshold voltage, and when a current flows through the diode, the threshold voltage or the more increased voltage of the diode is introduced to the source terminal of the switch 250 depending on the amount of the current.

Meanwhile, the protection device P3*a* may be decided by considering the changing range of the threshold voltage of the switch.

The description below is described by assuming that a resistance of the feedback resistor is very small.

For example, when radiation is irradiated to the switch 250, the threshold voltage is changed to −BV as shown in FIG. 2C, and four diodes of which threshold voltage is DV are connected in serial may be provided as the protection device.

Herein, D is a positive number, and it is described by assuming that the absolute value of B is smaller than the absolute value of 4D.

By the configuration described above, the increase of voltage due to the protection device P3*a* may exceed the absolute value of the threshold voltage.

According to the configuration described above, the increased voltage of 4DV may be introduced to the source terminal of the switch. When the voltage of the source terminal of the switch increases, Vgs becomes −4DV in the case that the control signal of 0V is input, and accordingly, the switch may be turned off even in the case that the threshold voltage is decreased to −BV.

Meanwhile, in the case that the control signal of which magnitude of difference from 4DV is greater than Vth is introduced, since Vgs becomes greater than Vth, the switch may operate to be turned on.

The protection device may be provided by the configuration in which diodes are connected in serial as shown in FIG. 3A, or by the configuration in which diodes are connected in parallel as shown in FIG. 3B.

Meanwhile, according to another embodiment of the present disclosure, diodes may be provided by the configuration as shown in FIG. 3C by changing the connection direction thereof.

Specifically, FIG. 3C shows the configuration in which a plurality of diodes is connected in serial in a direction and connected in parallel in the opposite direction with the diodes.

Particularly, a plurality of diodes connected in serial in a first direction may form a first diode group G31.

In addition, the diodes connected in serial in a second direction, which is the opposite direction to the first direction, may form a second diode group G32.

The diode included in the second diode group G32 may include a single diode or a plurality of diodes.

The first diode group and the second diode group may be connected in parallel.

As described above, there is no limitation in the connection configuration of the diodes that form the protection device, and there is no limitation in the way of providing diodes as the protection device in addition to the connection configuration described in the present disclosure.

Figure 4A:
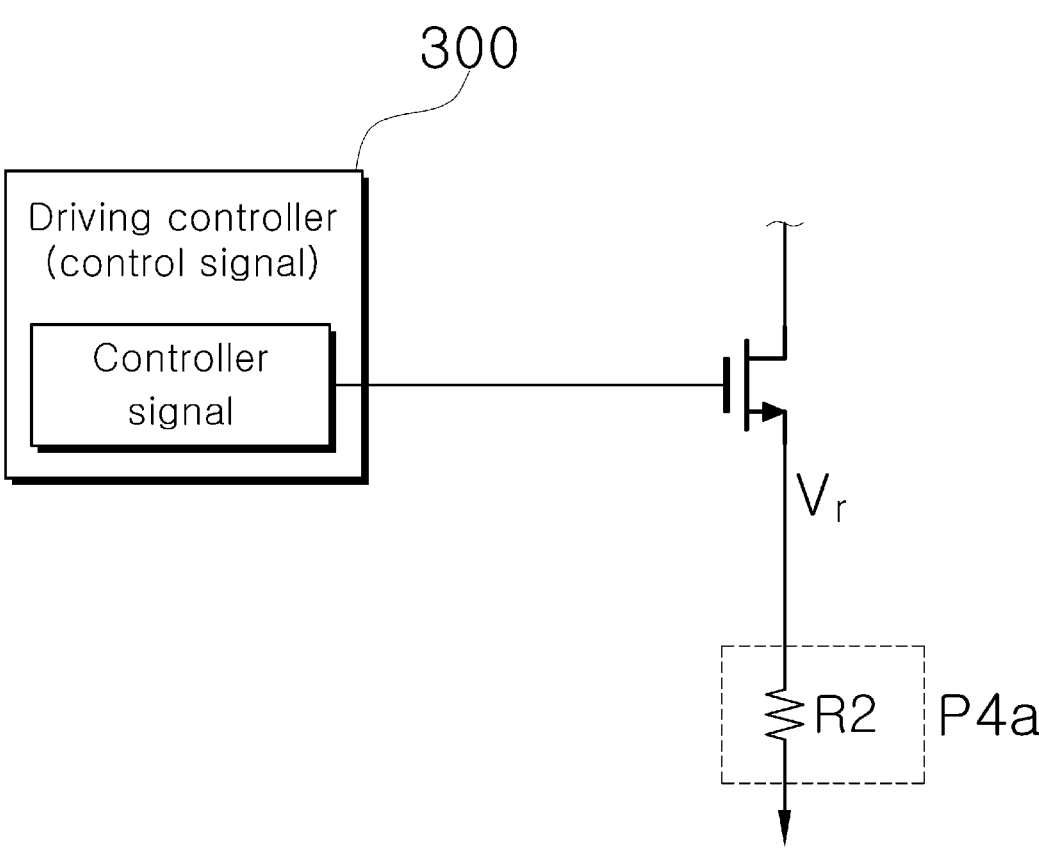
FIGS. 4A and 4B are diagrams illustrating an embodiment in which the protection device is implemented as a resistor.
Figure 4B:
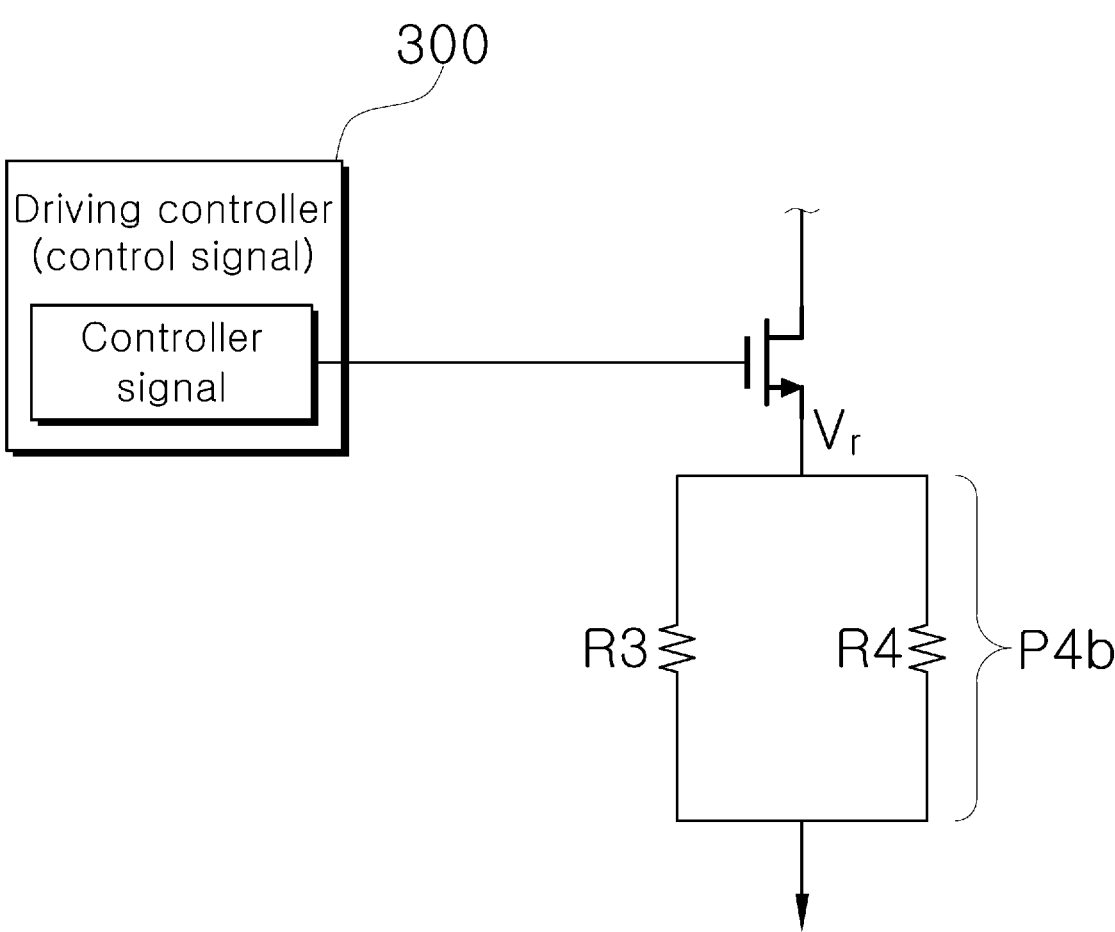

FIGS. 4A and 4B are diagrams illustrating an embodiment in which the protection device P4*a* or P4*b* is implemented as a resistor.

When a current flows through a resistor, a voltage is introduced in response to the flowing current, and in the case that a current flows by the operation of the switching converter 200, the voltage is increased corresponding to the current in the source terminal of the switch.

Meanwhile, the protection device P4*a* or P4*b* may be decided by considering the changing range of the threshold voltage of the switch.

As shown in FIG. 4A, in the case that radiation is irradiated to the switch 250 and the threshold voltage is changed to −EV, the protection device P4*a* may be provided as a resistor of which resistance is K ohms (Ω), and when 1 A of current flows through the protection device P4*a*, a voltage KV may be introduced to the protection device (herein, E and K are positive numbers, and the absolute value of E is smaller than K).

According to the configuration described above, the increased voltage of KV may be introduced to the source terminal of the switch. When the voltage of the source terminal of the switch increases, Vgs becomes −KV in the case that the control signal of 0V is input, and accordingly, the switch may be turned off even in the case that the threshold voltage is changed to −EV.

That is, when the control signal of (K−E)V or greater is introduced, Vgs becomes greater than −EV, and the switch may be turned on.

The protection device may be provided in the configuration in which the resistors are connected in serial as shown in FIG. 4A, or may be provided in the configuration P4*b* in which the resistors are connected in parallel as shown in FIG. 4B.

Meanwhile, the configuration of the protection device described above is merely an embodiment to describe the inventive concept, and there is no limitation in a type and a configuration of the protection device so long as an element is to increase the voltage of the source terminal of the switch.

Figure 5A:
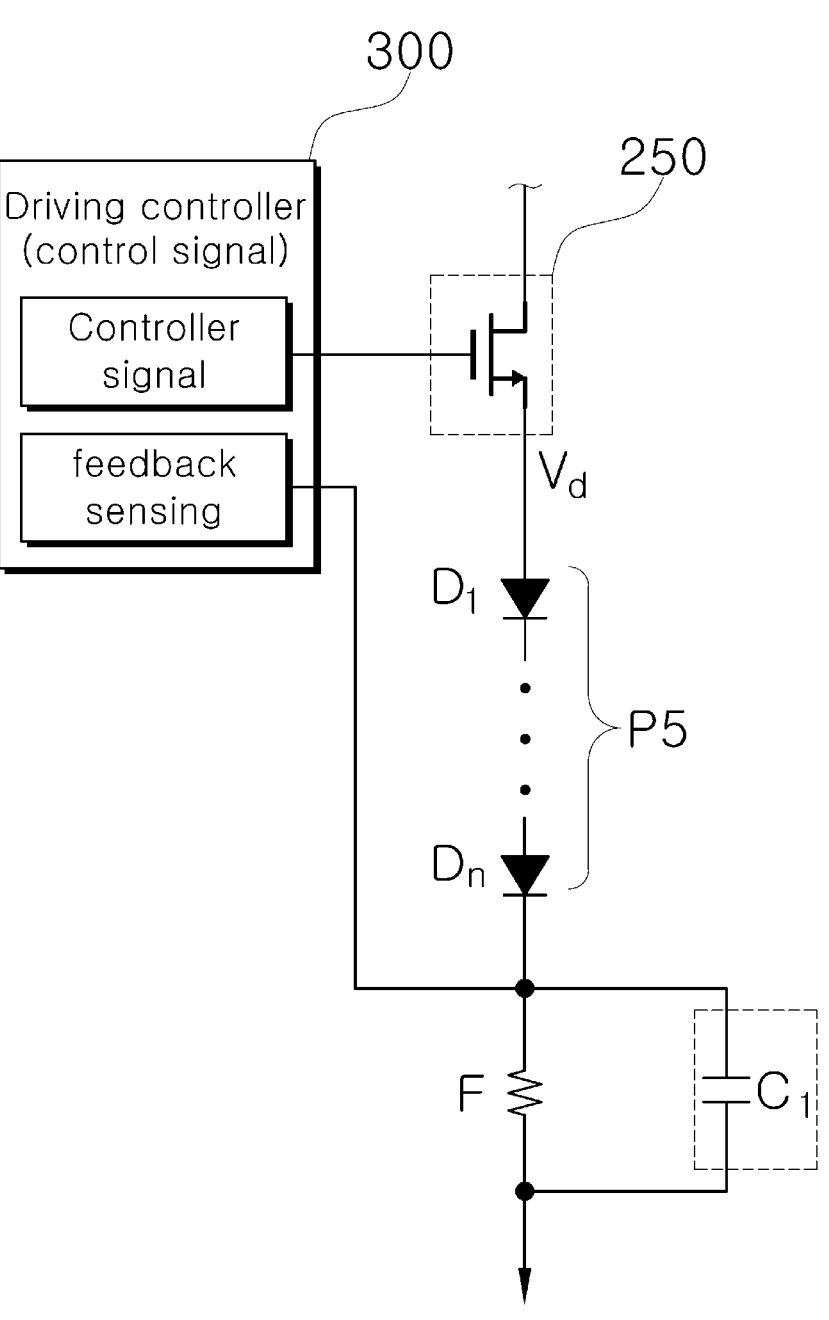
FIG. 5A is a diagram illustrating that a feedback resistor and a buffer capacitor are connected according to an embodiment.
Figure 5B:
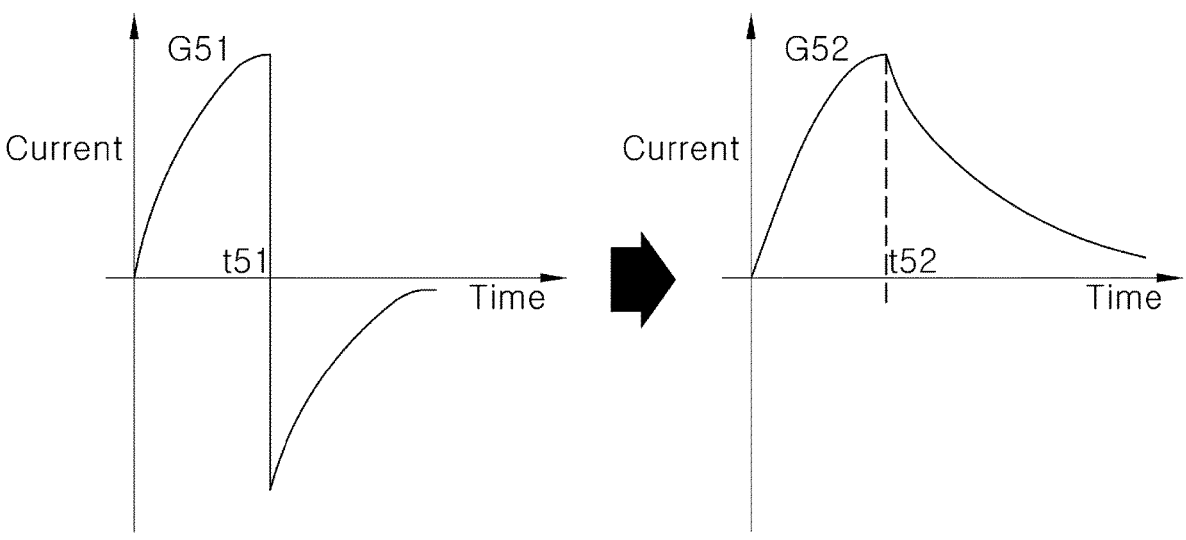
FIG. 5B is a graph for describing the function of a buffer capacitor according to an embodiment.

FIG. 5A is a diagram illustrating that a feedback resistor F and a buffer capacitor C1 are connected according to an embodiment, and FIG. 5B is a graph for describing the function of a buffer capacitor C1 according to an embodiment. In addition, FIG. 5A shows that diodes are connected in serial as the protection device P5.

Referring to FIG. 5A, the driving controller may be connected to a feedback resistor F and sense the current that flows through the feedback resistor.

Based on this configuration, the driving controller 300 may control the switching converter.

Particularly, the driving controller 300 may send the control signal such that the switch is turned off when a large amounts of current flows through the feedback resistor F and decrease the current flowing through the feedback resistor F.

Particularly, the driving controller 300 may send the control signal such that the switch is turned on when a small amounts of current flows through the feedback resistor F and increase the current flowing through the feedback resistor F.

The resistance of the feedback resistor F may be decided arbitrarily, but may be decided to perform the boosting operation of the switching converter described above.

Meanwhile, referring to FIG. 5A and FIG. 5B together, a current of a great change may flow through the switch according to on and off states of the switch. To prevent the abrupt change G51 of the current, the feedback resistor F is connected to the switching converter in parallel, and the buffer capacitor C1 may be further provided between protection device P5 and a ground.

G51 of FIG. 5B is a graph showing the current flow in which the buffer capacitor is not provided, and G52 of FIG. 5B is a graph showing the current flow in which the buffer capacitor is provided.

In the case that the buffer capacitor is not provided (G51), the current flow changes abruptly on timing t51 on which the operation of the switch is changed, but in the case that the buffer capacitor is provided (G52), the abrupt current change may be prevented by the charging of the capacitor on timing t52 on which the operation of the switch is changed.

The charge of the buffer capacitor is charged by the operation, and even in the case that the on/off operation of the switch is performed, the current change is reduced, and accordingly, the operation of the switching converter may be performed stably.

According to an embodiment of the present disclosure, an erroneous operation or destruction of a power supply device of an electronic device used in a space in which an environmental stress may occur may be prevented, and power may be stably supplied to the electronic device in which the stress may occur.

In addition, according to an embodiment of the present disclosure, an electronic device is usable even in an environment in which destruction of a power supply device is concerned.

In addition, according to an embodiment of the present disclosure, a leakage current of a semiconductor switch device used in a power supply device may be reduced.

Effects of the inventive concept are not limited to the effects mentioned above, and other effects not mentioned will be clearly understood by those skilled in the art from the following description.

Steps or operations of the method or algorithm described in relation to an embodiment of the inventive concept may be implemented directly in hardware, may be implemented with a software module executable by hardware, or may be implemented by a combination thereof. The software module may reside in a random access memory (RAM), a read only memory (ROM), an erasable programmable ROM (EPROM), an electrically erasable programmable ROM (EEPROM), a flash memory, a hard disk, a removable disk, a CD-ROM, or a computer-readable recording medium well known in the art to which the inventive concept pertains.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A power supply device, comprising:
   a switch including a first terminal and a second terminal receiving an input of a control signal, the switch operating to be turned on or off by comparing magnitudes of a voltage between the first terminal and the second terminal with a threshold voltage;
   a protection device connected to the first terminal to change a magnitude of a source voltage of the first terminal,
   wherein the magnitude of the source voltage of the first terminal is adjusted to be increased in comparison with a case that the protection device is replaced with a short circuit;
   a switching converter for generating an output power by using an input power of an input power supplier including the switch and the protection device;
   a driving controller for generating an operation control signal of the switching converter; and
   a power generator for supplying power to at least one of the switching converter or the driving controller,
   wherein the protection device is constructed to be connected to a ground of the switching converter with the first terminal,
   wherein the protection device is constructed to introduce the source voltage to the first terminal based on the control signal being introduced and the switch being turned on,
   wherein the protection device includes a plurality of diodes having the threshold voltage of a predetermined magnitude, and
   wherein the protection device is constructed by connecting a first diode group and a second diode group in parallel, and wherein the first diode group includes at least one diode connected in a first direction in serial and the second diode group includes at least one diode connected in a second direction which is opposite to the first direction in serial.

2. The power supply device of claim 1, wherein the driving controller determines the control signal such that a maximum value of a voltage difference between the first terminal and the second terminal, which is a voltage to turn on the switch, exceeds an amount of difference between the threshold voltage and the source voltage.

3. The power supply device of claim 1, wherein the switching converter further comprises a feedback resistor connected to the driving controller and disposed between the protection device and the ground.

4. The power supply device of claim 3, wherein the switching converter further comprises a buffer capacitor connected to the feedback resistor in parallel and disposed between the protection device and the ground.

5. The power supply device of claim 3, further comprising a load driven by receiving the output power, wherein the driving controller determines the control signal able to supply the output power that corresponds to the load through the input power and an inductor based on a current flowing through the feedback resistor.

6. The power supply device of claim 3, wherein the switch includes a third terminal connected to an inductor, and wherein the driving controller determines the control signal that decides an amount of current delivered through the third terminal based on the current flowing through the feedback resistor independently from the change of the threshold voltage.

\* \* \* \* \*